United States Patent

Kolstrup

[11] Patent Number: 6,039,668
[45] Date of Patent: Mar. 21, 2000

[54] PLANET GEAR FOR HIGH REVOLUTIONS

[75] Inventor: Anders Peter Kolstrup, Skelmosevej, Denmark

[73] Assignees: Orla Kragh Jensen, Greve; Lars Barthold Nielsen, Copenhagen, both of Denmark

[21] Appl. No.: 08/930,021

[22] PCT Filed: Mar. 28, 1996

[86] PCT No.: PCT/DK96/00127

§ 371 Date: Sep. 26, 1997

§ 102(e) Date: Sep. 26, 1997

[87] PCT Pub. No.: WO96/30670

PCT Pub. Date: Oct. 3, 1996

[30] Foreign Application Priority Data

Mar. 29, 1995 [DK] Denmark ................................. 0335/95

[51] Int. Cl.[7] ................................................ F16H 13/06
[52] U.S. Cl. ........................... 475/183; 475/346; 475/334
[58] Field of Search ................................. 475/334, 346, 475/347, 159, 162, 183; 74/640

[56] References Cited

U.S. PATENT DOCUMENTS

| 1,585,198 | 5/1926 | Matteucci ........................... 475/183 X |
| 1,985,645 | 5/1934 | Rosner . |
| 2,344,078 | 3/1944 | Brissonnet et al. ...................... 475/183 |
| 2,815,685 | 12/1957 | Parrett ..................................... 475/183 |
| 3,633,441 | 1/1972 | Hicks ....................................... 475/334 |
| 3,737,014 | 6/1973 | Dalrymple ........................... 74/640 X |
| 3,941,004 | 3/1976 | Kraus ................................. 475/159 X |
| 4,440,043 | 4/1984 | Kraus ................................. 475/183 X |
| 4,944,195 | 7/1990 | Takahashi et al. .................. 475/346 X |
| 4,950,110 | 8/1990 | Suzuki ............................... 475/183 X |
| 5,779,589 | 7/1998 | Futterer .................................. 475/346 |

FOREIGN PATENT DOCUMENTS 60-196448  10/1985  Japan ..................................... 475/334

Primary Examiner—Charles A. Marmor
Assistant Examiner—Scott Lund
Attorney, Agent, or Firm—Nims, Howes Collison, Hansen & Lackert

[57] ABSTRACT

A planet gear has an input axle (1a), an outer ring (4) which presses planet wheels (6) radially against a central sun axle (2), the planet wheels (6) being rotatably mounted on stays (7), the diameters of which are smaller than the holes in the planet wheels (6). The input axle (1a) has a driver (1) with holes (3) for studs (5) on the outer ring (4), so that the rotation of the input axle (1a) is transferred via the driver (1) and the outer ring (4) to the planet wheels (6) and to the sun axle (2), whereby the stays (7) for the planet wheels (6) are disposed in such a manner that when the applied moment increases, the planet wheels (6) are pressed harder against the sun axle (2) and the outer ring (4) is similarly pressed harder against the planet wheels (6).

8 Claims, 4 Drawing Sheets

IDLE POSITION

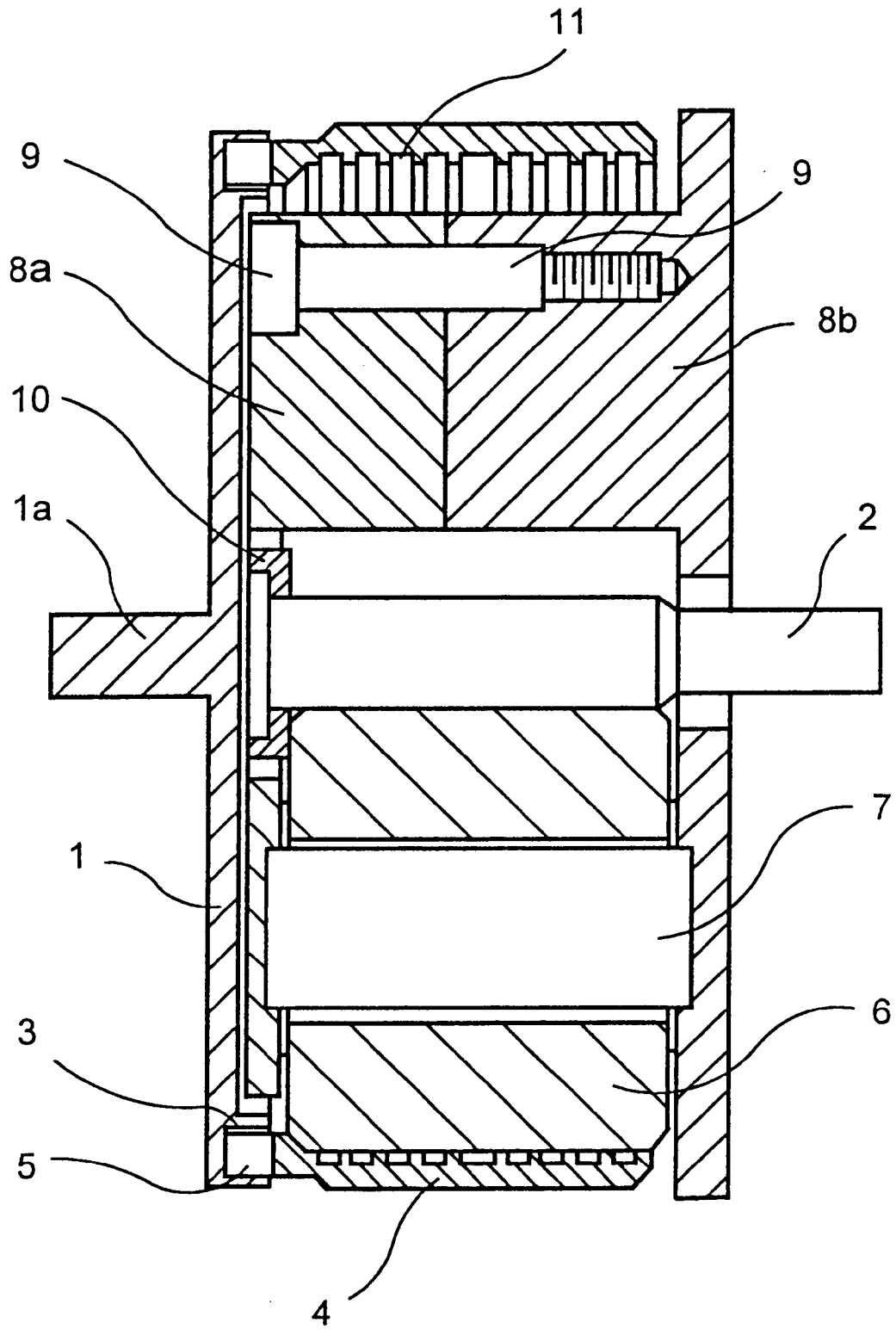
F I G. 1

IDLE POSITION

PLANET GEAR FOR HIGH REVOLUTIONS

The invention relates to a planet gear comprising a central, rotatable input axle, a flexible outer ring, which under elastic deformation surrounds and presses at least three planet wheels in the form of rollers radially up against a centrally-disposed sun axle which extends axially in line with the input axle, said planet wheels having central holes and being rotatably mounted on stays, the diamters of which are smaller than the holes in the planet wheels, and where the centre-lines of the stays are parallel with the sun axle.

From U.S. Pat. No. 1,985,645 there is known a planet gear with a driving sun axle which is rotatably mounted in a support by means of bearings and is controlled against axial movement by a flange and a collar. A driven element is concentric with an extended cylindrical part of the driving sun axle and is integral with a shaft through which the gear can be connected to a machine.

In contact with the cylindrical part of the sun axle there is a first series of planet wheels disposed at a mutual distance, and radially outside there is provided a second series of planet wheels which are in contact with the first series of planet wheels and the inside circumference of a flexible outer ring. Each series preferably comprises an even number of planetary wheels, where the radially internal first series is of the same diameter. The radially external second series preferably comprises two planet wheels which have a slightly greater diameter than the remaining radially external planet wheels which, as a consequence of the even number of planet wheels, are disposed on diametrically-opposite sides of the sun axle. The outer ring is preferably configured with its internal diameter slightly smaller than the overall dimension which is measured across the planet wheels, whereby the outer ring in the assembled state is slightly deformed and presses the two planet wheels with the slightly greater diameter towards the centre of the sun axle, and causes all of the remaining planet wheels to enter into frictional engagement with each other and with the sun axle.

The outer ring forms a friction-providing surface for the driven element and is in driving engagement herewith by means of grooves in the driven element, said grooves having a sliding engagement with complementary keys on the outer ring, in that the keys move radially into the grooves during the rotation of the gear.

The function of the planet gear is explained thus: The external part of the outer ring's keys, which stand opposite to the planet wheel with the slightly greater diameter, are pressed to the bottom of the corresponding groove without deforming the driven element, which can be made as rigid as possible for the correct transmission of the force, while the outer ring's keys opposite the space between two of the remaining planet wheels in the radially external set are moved slightly inwards.

At least one of the planet wheels with the slightly larger diameter is preferably mounted in a rotatable manner on a firm support, such as a bearing, in order to absorb the planet wheel's reaction to the torque.

In the publication there is not described any radial displacement of the at least one planet wheel which has the slightly larger diameter and is mounted on a firm support. In a figure is shown a slot of uniform thickness around the bearing for the disclosed firmly supported planet wheel, which slot must be understood to be incorrectly drawn, in that the flexible outer ring will attempt to assume a circular shape and hereby press the bearing inwards.

If the disclosed planet wheel with the slightly larger diameter is deliberately meant to be suspended in a radially displaceable manner, a ramp effect which is described in the following could not be achieved, in that a greater deformation of the flexible outer ring—as a consequence of an outwardly-directed movement of the disclosed planet wheel—will be cancelled by a smaller deformation at the remaining planet wheels in the radially external set of planet wheels.

Since the radially internal set of planet wheels and the remaining planet wheels in the radially external set of planet wheels are completely without any fast supports, there will not arise any ramp effect here either, in that the fast supports, as explained in the following, are precisely a prerequisite for the ramp effect.

It is obvious that the arrangement of driving and driven parts can be exchanged in accordance with requirements.

Depending on the construction's configuration there is hereby achieved a certain and constant transferable moment and, regardless of the magnitude of the moment applied, the normal forces between the parts of the planet gear will be constant.

This results in unnecessary wear and limits the transferable moment of the planet gear.

Moreover, the known planet gear is expensive as a consequence of two sets of planet wheels.

A planet gear of the kind described by way of introduction is known from U.S. Pat. No. 2,344,078, which is used for the driving of a centrifugal charger for a combustion engine. This planet gear is more simple than the above-mentioned planet gear, in that it has only one set of planet wheels and does not have keys on the outer ring in engagement with grooves in the surrounding driver. The diameter of the sun axle and the planet wheels is such that the desired conversion ratio between the input shaft and the sun axle is achieved. The planet wheels' stays are mounted on a driver which is firmly connected to the input shaft, and the centre-lines of the stays are placed on a pitch diameter which coincides with the axes of the planet wheels when the planet wheels lie up against the sun axle. The length of the sun axle, which is in contact with the planet wheels, is dimensioned so that the friction between them ensures the transfer of the moment. By letting the planet wheels rotate around fixed stays, a constant force is achieved between planet wheel and sun axle.

A centrifugal charger requires an increasing transfer of moment with increasing revolutions. However, in the known planet gear, because of the centrifugal forces, the transfer of moment decreases with increasing revolutions, in that the centrifugal forces on the planet wheels at high revolutions reduces the amount of friction available between sun axle and planet wheel in the same manner as with the planet gear discussed above.

It is the object of the invention to provide a planet gear which, with its special configuration, ensures that the transferable moment is automatically tuned in accordance with requirements, even at high revolutions.

This object is achieved with a planet gear of the kind disclosed in the introduction, said planet gear according to the invention being characteristic in that the centre-lines of the stays are disposed closer to the sun axle than the axes of the planet wheels when the planet wheels lie up against the sun axle.

In the planet gear according to the invention, the contact line of a planet wheel and the sun axle—which in the idle position lies in a plane through the gear's central axis and the planet wheel's axis—will during rotation move away from the gear's central axis along the surface of the stay if the sun axle extends rotational resistance, in that the contact line is displaced further away from the centre with greater resistance. Since the surfaces between stay and the inside of the planet wheel in the vicinity of the contact line constitute an inclined ramp, through increased normal force between planet wheel and sun axle there is thus achieved a self-reinforcing transfer of moment, which in the foregoing and in the following has been called the ramp effect. Since the sun axle is deformed under the influence of the normal force, an increased clearance will arise between the stay and the planet wheel's inner surface towards the centre, the size of which will depend on the amount by which the contact line has moved outwards. This is explained in more detail in the following special part of the description.

The extra normal force, together with the traction oil with which the gearbox is filled, ensures an advantageous friction between the planet gear's components.

In the planet gear according to the invention, the sun axle is moreover freely suspended and is controlled only by the planet wheels, whereby bearings for the sun axle are avoided. The planet gear according to the invention is thus configured in a more simple manner than the known planet gears, and is therefore less expensive to produce.

According to a preferred embodiment, the input shaft comprises a disk-shaped driver firmly connected hereto, the sides of which are provided with circular-cylindrical holes for the engagement of circular-cylindrical studs which are provided on the flexible outer ring, said holes being placed on a pitch circle diameter which is less than the pitch circle diameter for the outer ring's studs in the idle state of the outer ring.

With this embodiment, when the studs pass the outer ring's contact line with the planet wheels, they will influence the outer ring towards the centre and thus reinforce the ramp effect. Correspondingly, when the studs pass between two successive planet wheels in the direction of rotation, they will be influenced outwards, whereby the outer ring is further tightened up with subsequent increased normal force in the contact line.

According to a second embodiment of the invention, the driver is configured to surround the outer ring's radial outer side and support elements in the form of studs or rollers, the position of which on the outer ring is placed on a pitch circle diameter which is less than the outer diameter of the outer ring in the idle state of said outer ring.

In an advantageous embodiment of the planet gear according to the invention, the internal, annular surface on the outer ring is provided with grooves, whereby oil-planing between outer ring and planet wheel is avoided.

In the planet gear according to the invention, the stays are controlled by a frame, in relation to which the driver, the outer ring, the planet wheels and the sun axle can rotate. There is hereby achieved a compact and robust construction of the planet gear.

It will be seen from the construction that the use of the input shaft and the sun axle can be reversed, so that a gearing-down is achieved instead.

The planet gear according to the invention is described in more detail in the following with reference to the drawing, where FIG. 1 shows the section in a planet gear according to the invention as indicated by the line I—I in FIG. 3, FIG. 2 shows the forces between the outer ring, a planet wheel and the sun axle in the planet gear according to the invention, and FIG. 3 is a picture of the outer ring and the planet wheels in the planet gear according to the invention.

In FIG. 1 is seen a section through a planet gear according to the invention. The gear comprises a circular, disk-shaped driver 1 with the one side having a projecting axle journal 1a which constitutes an ingoing axle, the rotation of which must be converted to the rotation of a sun axle 2, the one end of which extends out of the gear, in that the sun axle 2 is axially in line with the ingoing axle journal 1a.

Figure 3:
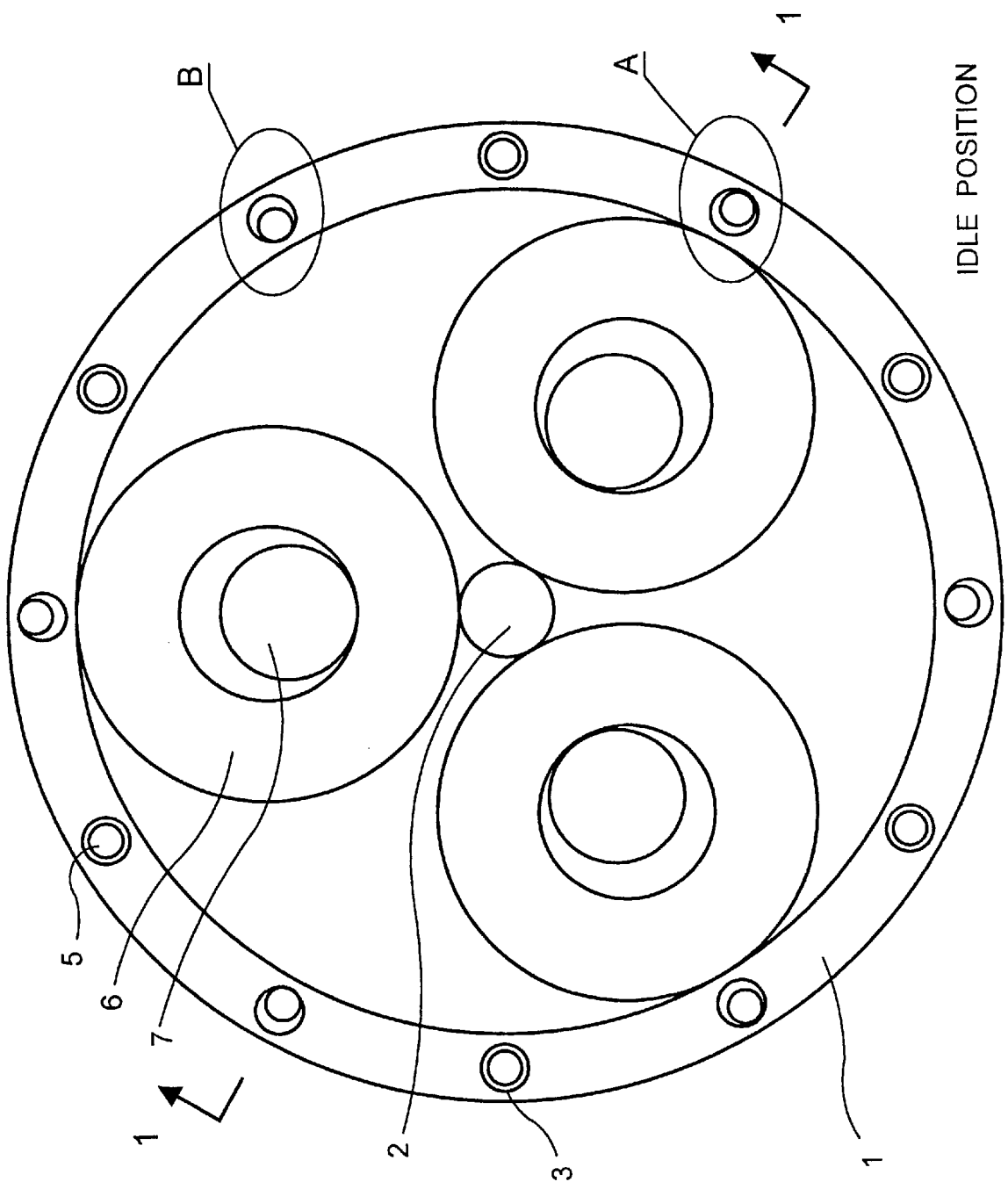

Distributed at uniform distance near the circumference of the driver 1 there are a number of holes 3. The number of these holes shown by way of example in FIG. 3 is 12. There is also a flexible outer ring 4 which, on that side which faces towards the driver 1, has a number of studs 5 corresponding to the number of holes 3 and which engage in said holes 3.

The studs 5 have a smaller diameter than the holes 3, so that the flexible outer ring 4 can be moved and slightly deformed in relation to the driver 1. When the studs 5 are engaged in the holes 3, the outer ring 4 is driven by the driver 1 when this is rotated.

The outer ring 4 surrounds three planet wheels 6 formed as stiff bushes or rollers which lie up against the sun axle 2 placed centrally between the planet wheels 6.

The planet wheels 6 have central holes and are mounted loosely on stays 7 which have a slightly smaller outer diameter than the holes in the planet wheels 6. The centre-lines of the respective stays 7 for the planet wheels 6 are thus parallel with, but not coincident with the axes of the planet wheels 6.

The stays 7 are controlled in a frame 8 which consists of a first frame part 8a and a second frame part 8b, whereby also the planet wheels 6 are controlled within the flexible outer ring 4.

The two frame parts 8a, 8b are assembled by means of guide-bolts 9, the cylindrical shafts of which fit tightly in bores in the frame parts in order to ensure their mutually precise position.

To ensure the axial position of the sun axle 2 in the gear, the end of the sun axle 2 which extends into the gear has a collar. This collar lies with its side up against the one side surface of a slide-disk 10, the opposite second side surface of which lies up against the axial, internal ends of the planet wheels 6.

It should be noted that there are no other forms of bearings for the control of the sun axle 2.

Before mounting, the inner diameter of the outer ring 4 is slightly smaller than the diameter of that circle which is tangent to the three planet wheels 6. It will be understood that the outer ring 4 during elastic deformation presses the planet wheels 6 against the centrally-placed sun axle 2.

Radial forces hereby arise between the outer ring 4, the planet wheels 6 and the sun axle 2. These normal forces, together with the traction oil with which the gear is filled, ensure a friction between the component parts of the gear, whereby the sun axle 2 can be made to rotate when the outer ring 4 is turned by the driver 1.

Figure 2:
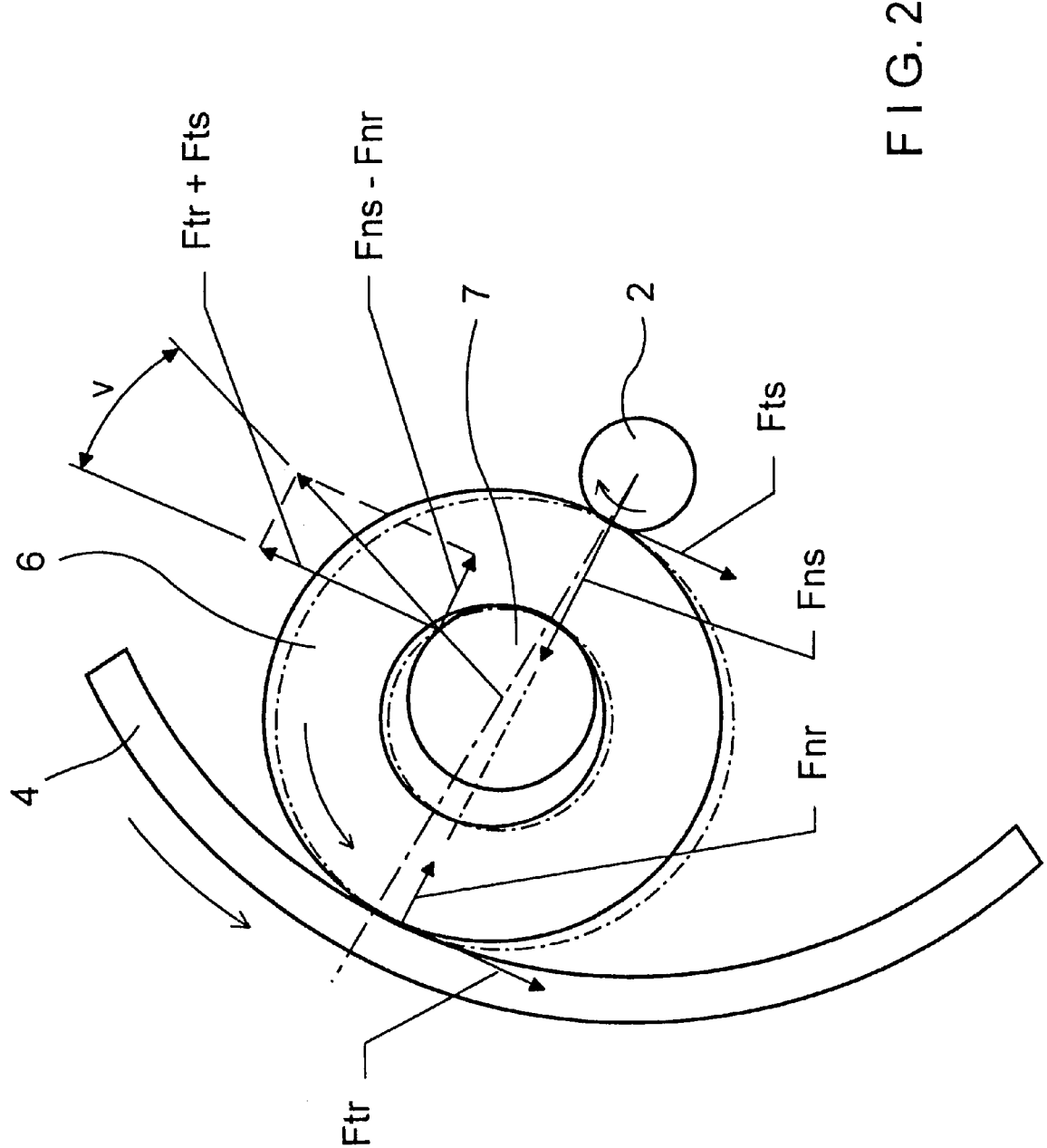

FIG. 2 shows the forces between an outer ring 4, a planet wheel 6 and a sun axle 2. The situation in which the gear is not rotating and everything is in balance is shown with continuous lines. During operation, the planet wheel 6 will move to a position which is shown with stippled lines. It is seen clearly that the planet wheel 6 is pressed against the sun axle 2 by the distortion of the flexible outer ring 4, and that the hole in the planet wheel 6 is larger than the diameter of the stay 7, although for the sake of clarity this difference is somewhat exaggerated in FIG. 2.

Due to the distortion of the flexible outer ring 4, various components arise which in FIG. 2 are designated as follows:

Fnr=normal force on the planet wheel from the outer ring,
Fns=normal force on the planet wheel from the sun axle,
Ftr=tangential force between the planet wheel and the outer ring, and
Fts=tangential force between the planet wheel and the sun axle.

Since the equilibrium of forces must be fulfilled for a planet gear, the resulting component in the direction of the normal forces (Fn) must be equal to the sum of the normal forces (Fnr, Fns), and the resulting component in the direction of the tangential forces (Ft) must be equal to the sum of the tangential forces (Ftr, Fts).

There are no resulting centripetal forces, the reason being that the planet wheels 6 are loosely mounted on fixed stays 7.

The following is the relationship between the two force components:

$$\frac{Fns - Fnr}{Ftr + Fts} = \text{tangent } v$$

or, since Fts≅Ftr $$Fns \cong \text{tangent } v \cdot 2Ftr + FNr$$

When considering the force components in FIG. 2, it will be seen that the radial position of the stay 7 in relation to the planet wheel 6 contributes towards the determination of the moment transferred, in that the frictional force is proportional to the normal force.

If the centre-line of the stay 7 is moved outwards so that there is coincidence with the centre-line of the planet wheel 6, then v=0, which means that Fns=Fnr and there is thus no ramp effect.

FIG. 3 is a picture of the driver 1 and the flexible outer ring 4 in the idle position.

It will be seen that during rotation, the holes 3 in the driver 1 in position (A) will press radially inwards against the studs 5 in the outer ring 4, and that during rotation the driver's holes 3 in position (B) will pull radially outwards on the studs 5 in the outer ring 4.

The circular cylindrical holes 3 which receive the circular cylindrical studs 5 are placed on a pitch circle diameter 12 which is less than the pitch circle diameter 13 for the studs 5 in the idle state of the outer ring.

The mentioned second frame part 8b can serve as suspension for the gear when this frame part 8b is secured in any suitable manner to a frame not shown in the drawings.

The diameter of the sun axle 2 and the diameter for the planet wheels 6 are dimensioned so that the desired conversion ratio is achieved between the number of revolutions for the ingoing axle journal 1a and the sun axle 2.

That part of the surface of the sun axle 2 which is in contact with the planet wheels 6 can possibly be provided with a coating which can increase the friction.

The radial inner side of the outer ring 4 can with advantage be provided with annular grooves 11 which prevent oil-planing during high revolutions, so there is a possibility for the use of oils of several different types.

Figure 5:
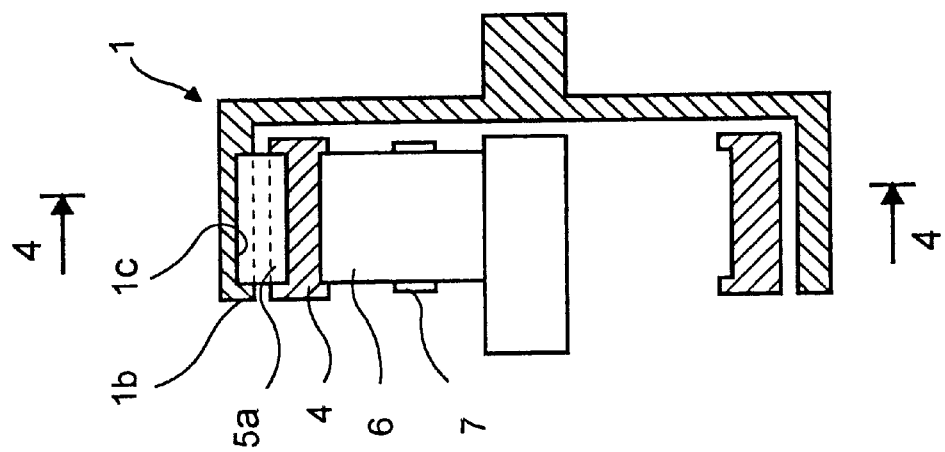
FIG. 5 is a sectional view of the planet gear shown in FIG. 4.
Figure 4:
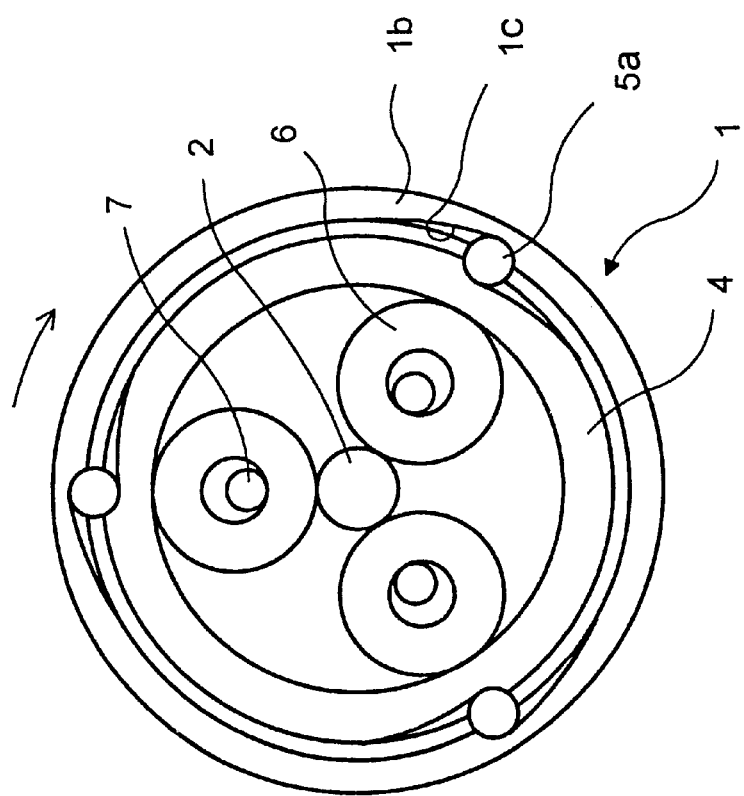
FIG. 4 is a picture showing the outer ring and the planet wheels in the planet gear according to an alternative embodiment of the invention.

In a second embodiment, which is shown in part in the drawing FIGS. 4 and 5, the driver 1 is configured to surround the radial outer side of the outer ring 4, in that the driver is provided with a collar (1b) which extends along with the outer ring 4. A radial inner side (1c) of the collar supports elements 5a in the form of studs or rollers, the position of which on the outer ring 4 is disposed on a pitch circle diameter which is smaller than the outer diameter of the outer ring 4 when the outer ring 4 is in the idle state.

I claim:

1. A planet gear consisting essentially of a central, rotatable input axle (1a); at least three planet wheels (6); stays (7); a centrally-disposed sun axle (2); and a flexible outer ring (4) which under elastic deformation surrounds and presses the at least three planet wheels (6) in the form of rollers radially up against a centrally-disposed sun axle (2) which extends axially in line with the input axle (1a), said planet wheels (6) having central holes and being rotatably mounted on the stays (7), diameters of the stays being smaller than the holes in the planet wheels, center lines of the stays being parallel with the sun axle, center lines of the stays disposed closer to the sun axle than axes of the planet wheels when the planet wheels lie up against the sun axle, the input axle (1a) including a firmly connected disk-shaped driver (1), a side of which is provided with circular-cylindrical holes (3) for the engagement of circular-cylindrical studs of the flexible outer ring (4), the circular-cylindrical holes disposed on a pitch circle diameter which is smaller than a pitch circle diameter for the studs of the outer ring when the outer ring is in an unloaded state.

2. The planet gear according to claim 1, characterized in that an internal surface of the outer ring (4) has annular grooves (11).

3. The planet gear according to claim 1, characterized in that the stays (7) are controlled by a frame (8a, 8b), in relation to which the input axle (1a), the outer ring (4), the planet wheels (6) and the sun axle (2) can rotate.

4. The planet gear according to claim 1, characterized in that the outer ring (4) is pre-stressed around the planet wheels (6).

5. A planet gear consisting essentially of a central rotatable input axle (1a); at least three planet wheels (6); stays (7); a centrally-disposed sun axle (2); a driver (1); elements (5a); and a flexible outer ring (4) which under elastic deformation surrounds and presses the at least three planet wheels (6) radially up against the centrally disposed sun axle (2), the planet wheels (6) having central holes and being rotatably mounted on the stays (7), the stays (7) having diameters smaller than the central holes in the planet wheels, center lines of the stays disposed closer to the sun axle (2) than central axes of the planet wheels (6) when the planet wheels lie up against the sun axle (2), the driver (1) surrounding a radial outer side of the outer ring (4) and supporting the elements (5a), the elements (5a) disposed on a pitch circle diameter which is smaller than an outer diameter of the outer ring (4) when the outer ring (4) is in an unloaded state.

6. The planet gear according to claim 5, characterized in that an internal surface of the outer ring (4) has annular grooves (11).

7. The planet gear according to claim 5, characterized in that the stays (7) are controlled by a frame (8a, 8b), in relation to which the driver (1), the outer ring (4), the planet wheels (6) and the sun axle (12) can rotate.

8. The planet gear according to claim 5, wherein the outer ring (4) is pre-stressed around the planet wheels (6).

* * * * *